Dec. 12, 1967  J. W. BROPHY  3,357,375
INCINERATION OF INDUSTRIAL WASTE, AND APPARATUS
Filed Aug. 17, 1965  4 Sheets-Sheet 3

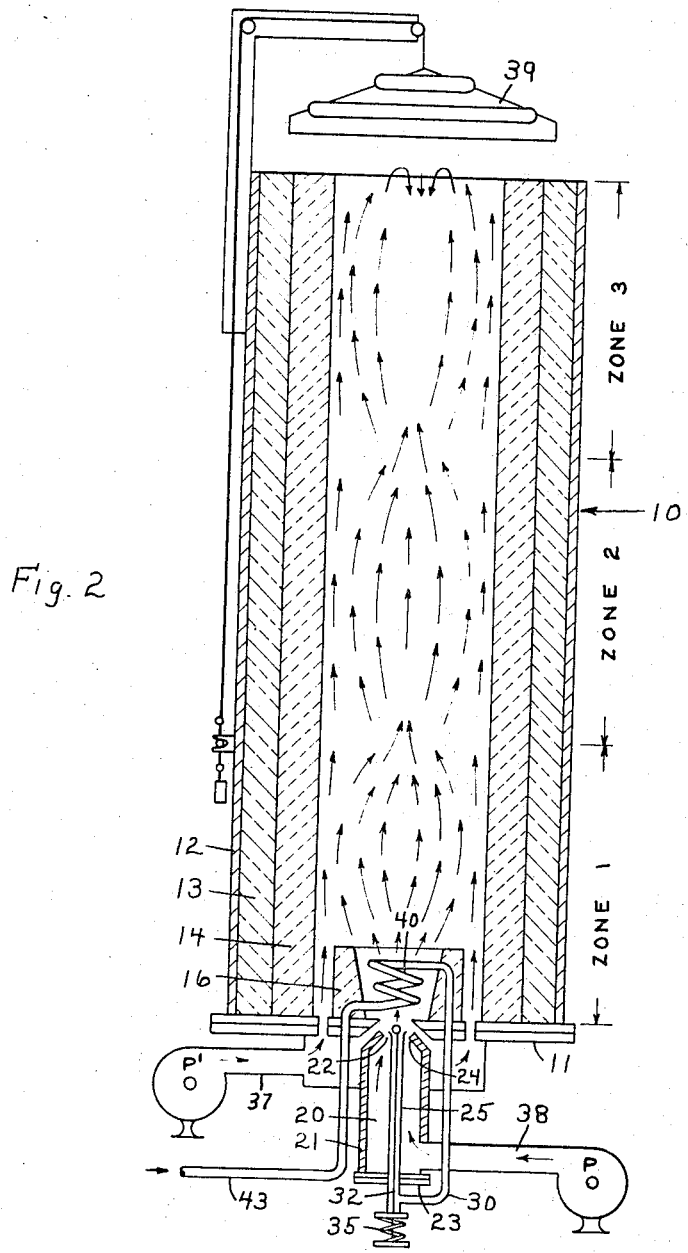

United States Patent Office 3,357,375
Patented Dec. 12, 1967

3,357,375
INCINERATION OF INDUSTRIAL WASTE, AND APPARATUS
John Warren Brophy, Royal Oak, Mich., assignor to Prenco Manufacturing Company, Royal Oak, Mich., a corporation of Michigan
Filed Aug. 17, 1965, Ser. No. 480,428
12 Claims. (Cl. 110—7)

ABSTRACT OF THE DISCLOSURE

A fluid (or, fluidized) waste material containing a combustible component is dispersed in a stream of primary air upwardly into the base of a vertical cylindrical elongated space, defined in part by refractory walls, the height of the space being five times its diameter. Combustion of the combustibles of the air-borne dispersed waste is initiated immediately upon its entry into the space to form a burning aeroform stream. The combustion is controlled to maintain a maximum temperature in the range 2800–3000° F., and the progress of the burning aeroform stream through the space is controlled through the imposition of a superatmospheric pressure to ensure a predetermined time of retention of the burning stream in said space. The burning areoform stream is surrounded, from the bottom upwardly, by a mantle of secondary air protecting the refractory walls from waste material impingement thereon, which secondary air eventually is used for completing, in the uppermost part of the space, the pyro-decomposition of the waste material and its conversion into a gaseous reaction product free from smoke, odor and visible ash.

---

This invention relates to the disposal of industrial wastes by pyro-decomposition of the same, and is concerned with an improved process of and improved apparatus for decomposing such wastes.

Included within the term "industrial waste" are a great variety of by-products of chemical industries, of petroleum industries, of the metalworking industry, of food processing and of paper making, to name a few illustrative applications.

It is a sad commentary on our current standards that industries have been, and in most instances still are being, permitted to dispose of industrial waste either by merely hauling (or otherwise transporting) the waste to, and dumping it into, a nearby pond or stream, or else by incomplete burning in inadequate facilities. The waste disposal system which constitutes the present invention is intended to meet the ever increasing demand, at the local, state and Federal level, that pollution of the country's air as well as its ponds, streams, rivers and lakes be eliminated and that proper steps toward abatement of such pollution be taken by commerce and industry.

From the standpoint of process, the invention comprises atomizing with a metered amount of primary air, into an elongated space defined in part by refractory walls, a fluid or fluidized waste material including a combustible component, combusting the combustibles of the air-borne atomized fluid waste material, upon its entry into said spaces, thereby forming a burning aeroform stream; surrounding the burning stream with a mantle of air protecting said refractory walls from waste material impingement; and using the air of said mantle for completing the combustion of said combustibles (i.e., as secondary air). To assist in the full and complete decomposition of everything combustible in said aeroform stream, the aeroform contents of the elongated space must be maintained at a pre-determined superatmospheric pressure for a desired time interval of high-temperature heating. Realization of a desirably extended "retention time" in the elongated space is promoted by using a minimum amount of atomizing (primary) air and mantle (secondary) air.

Preferably, the atomization of the aforesaid fluid material is greatly accelerated and "instant" combustion of its combustibles promoted by (a) pre-heating the fluid material, at superatmospheric pressure, to at least the vaporizing temperature of a vaporizable component of the fluid material and then (b) ejecting the so-heated stream through an orifice into said elongated space so as to effect atomization of the fluid material including the prompt vaporization of the vaporizable content of the fluid material.

The novel incinerator of the present invention comprises a refractory-lined tubular retort, an inspirator or nozzle means at one end of the retort for atomizing in primary air a combustibles-containing fluid waste material into said retort and means for supplying secondary air at the inspirator (nozzle) end of said retort. An important structural feature of the novel incinerator consists in proportioning the inner diameter of the refractory-lined tubular retort (furnace chamber) to its height at a 1-to-5 ratio. Said means preferably is associated with means for pre-heating a stream of such fluid material, to at least the vaporization temperature of a vaporizable constituent of such fluid material, immediately prior to delivery of the stream to said nozzle means. This pre-heating means may and preferably does take the form of a helically coiled tube disposed about a zone whereinto said inspirator means ejects said aeroform stream.

As to the inspirator means of the present invention, in its preferred embodiment the same comprises a tubular chamber closed at its lower end by means of a closure member and at its opposite end partially constricted by a conically inwardly flared top; an inlet for admitting atomizing (primary) air under pressure, from any suitable source, into the tubular chamber adjacent the lower end of the latter; an elongated ejection pipe extending upwardly through said closure member and coaxially through said chamber to said conically shaped top said ejection pipe at its upper end terminating in a conically outwardly flared mouth, the flared mouth of said ejection pipe cooperating with the inwardly flared top of said tubular chamber to define an annular slit for release of atomizing air; closure means at the lower end of said ejection pipe; means adjacent the lower end of said ejection pipe for feeding a stream of fluid material into said ejection pipe; a ball-like member above said outwardly flared mount of said ejection pipe, said ball-like member being biased toward said mouth by means of a rod or wire, on one end of which the ball-like member is rotatably mounted, and an adjustable spring loading at the lower end of the rod or wire for maintaining any predetermined "normal" back-pressure of fluid in its passage through the ejection pipe and adapted to function as an automatic relief valve in the event an abnormally high pressure develops in the fluid being forwarded to the inspirator.

As was stated hereinabove, the fluid or fluidized waste material fed to the incinerator shall contain a sufficient amount of a combustible or combustibles in order that the waste material shall be thoroughly disposed of by pyro-decomposition. In some—and probably most—instances the waste material to be eliminated contains a sufficient amount of combustibles in and of itself. Exemplifications of this situation are: waste cutting oils; sulfite and sulfide ("black") waste liquors; waste fish oils; still bottom sludges. In other cases, however, the waste material to be eliminated contains no—or only an inadequate amount of—combustibles; in such event it is of course necessary to associate with the waste in question more or less combustible material, which latter may be, and desirably is, itself a "waste material." Whether or not the added material is properly classifiable as a waste material, an amount is to be added—to the waste material—which will yield the necessary heat values to effect thoroughgoing pyro-decomposition of the waste.

While the added combustibles-rich material may be a mineral oil (petroleum) fraction or a fuel gas, it has been found that it is not only feasible but in many situations desirable to use coal as the source of the additional B.t.u.'s. Heretofore, the use of coal as auxiliary fuel for an incinerator had not been considered to be feasible due to the production of fly ash, and to the inadequacy of heat control and to the necessity for using a flash back arrester in the case of using powdered coal. In the present process coal can be utilized because the processing equipment can meter the needed coal into the fluid or fluidized waste material, break down the coal by a high speed decomposing means, and then—by means of a unique floatation pick-off method—carry forward into the burner only those coal particles which have reached a desired degree of subdivision. The feed is, or may be, automated by the burner temperature so as to supply only that amount of coal needed for proper combustion control.

The aforesaid "elongated space defined in part by refractory walls" is provided by the novel vertical up-fired retort of the present invention. The retort is composed of: a metal (e.g., steel) shell, cylindrical in form; an intermediate shell or container of a suitable high-temperature heat insulation and an inner refractory lining of free-standing monolithic design. The hereinabove-described atomizing means (atomizing air and combustion air systems, and waste inspirator) closes the lower end of the retort. At its upper end the retort is capped by a balanced, cone-shaped, sheet metal cover member which is so suspended and weighted as to provide a predetermined back pressure of the gases undergoing combustion for effecting a desired retention of the gases at high temperature, but which is immediately displaceable (from above the mouth of the retort) by the gases in the event of a buildup of excess pressure—e.g., an explosion—with following immediate resumption of its normal position above the mouth of the retort.

The invention will now be described in greater particularity and with reference to the appended drawings in which FIG. 1 is a diagrammatic representation of an incinerator apparatus system embodying principles of the present invention;

FIG. 2 is a larger scale diagrammatic showing, partially in section, of the incinerator retort (and its immediate appurtenances) appearing in FIG. 1;

Figure 1:
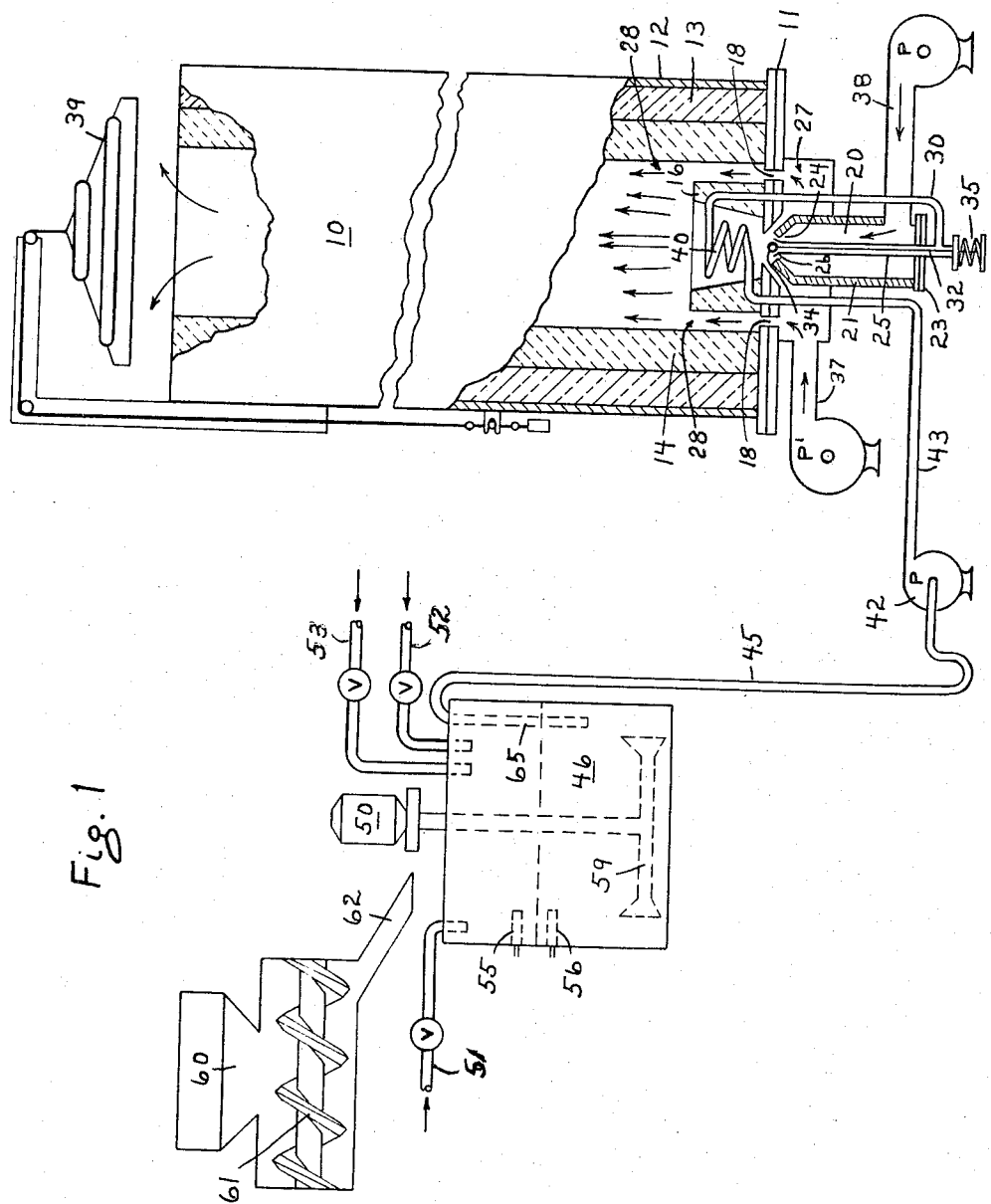
Figure 4:
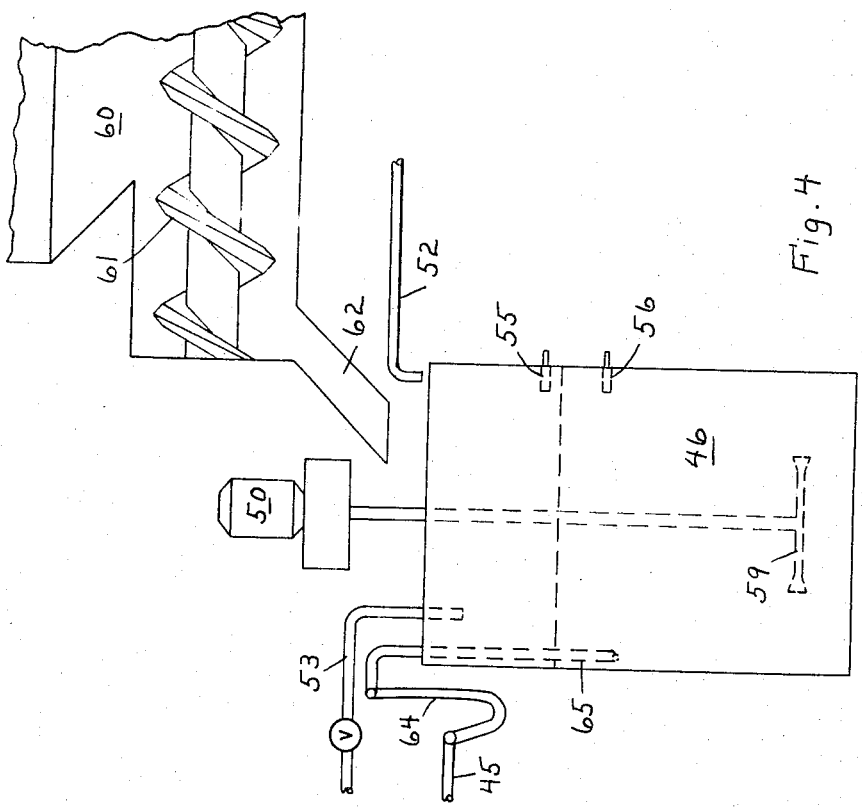
FIG. 4 is a diagrammatic representation of apparatus for use in utilizing coal as the auxiliary fuel of an incinerator system embodying principles of the present invention.

In FIG. 1 the retort per se is represented at 10. It rests on a base plate 11, which latter may and preferably is supported above the ground level on suitable legs (not shown). The retort walls are composed of an outer steel shell 12, an intermediate annulus of heat-insulating material 13, and an inner lining of high-temperature refractory material 14, which lining is not "tied" to the steel shell, but rather is self-supporting. Preferably, it is monolithic in structure. At the base of the retort there is positioned a ceramic tile 16 formed of a ceramic refractory material capable of withstanding high temperature gases. The tile is in the form of an annular member the inner wall of which is divergent in the direction of flow of the gases passed through the tile. That is to say, the space bounded by the curved inner wall of the member is in the form of an inverted frustrum of a cone. The ceramic tile 16 is positioned at the lower end of, and in co-axial relationship with respect to, the retort. An annular opening 18 in base plate 16 surrounds the base of ceramic tile 16 and provides an annular space between the outer periphery of said tile and the opposed inner surface of lining 14 of the retort.

Beneath the ceramic tile 16 there is disposed an inspirator 20. This latter consists of a generally vertically disposed cylindrical part 21, having at its upper end an inwardly flared end portion 22. The cylindrical part 21 is closed at its base by closure member 23. An elongated ejection pipe 25 extends vertically from a point beneath the base closure 23 through the latter and co-axially upwardly through the cylindrical part 21, terminating in an outwardly flared mouth portion 26. The outwardly flared part 26 and the inwardly flared end portion 22 of the cylindrical part 21 are arranged and positioned so as to form between them an annular slit or nozzle 24 for the discharge of an annular stream of gas (air) under pressure.

Adjacent the lower end of the ejection pipe is a feed pipe 30 for the delivery, to said ejection pipe, of fluid (or fluidized) waste material to be incinerated. Extending through the ejection pipe 25 and to a point beneath the lower end of the latter is a wire or rod 32 at the upper end of which there is rotatably mounted a ball-like rotatable member 34, which latter may and preferably is provided with spaced vanes which are angularly disposed so as to impart a spinning action to the ball-like member when struck by fluid waste material under pressure. At its lower end, the wire or rod 32 is associated with a biasing means, e.g., a compression spring 35, tending to bias the ball-like member 34 toward the mouth 26 of the ejection pipe 25. The biasing force of the spring can, as will be well understood, be adjustable by means of the nut 36 threaded to the base of the rod 32. This rotatable ball-like part of the inspirator functions to break up and disperse the fluid forced upwardly through the mouth of the ejection pipe, and it also acts as a relief valve rod ridding the inspirator of gross pieces of solid material which may inadvertently be forwarded through feed pipe 30. Adjacent the lower end of the cylindrical part 21 there is provided a conduit 38 for delivery of primary atomizing air, under pressure, from any suitable source, e.g., pump P, to the inspirator for eventual discharge through the annular slit 24. Secondary air is supplied to the retort by a suitable source, e.g., pump P', of air under pressure and its discharge conduit 37 leading to a chamber 27 surrounding the upper part of inspirator 20 and immediately beneath base plate 16. Annular opening 18 communicates between chamber 27 and the interior of the retort 10 through the aforesaid annular space between tile 16 and the retort lining 14, for providing secondary air for use in the pyro-decomposition operation within retort 10. A mantle of such secondary air is indicated at 28 in FIGS. 1, 2 and 5.

Capping the incineration retort is a balanced, weighted cover member 39 which is so secured, with respect to the retort, that it serves to retard the ready egress of combustion gases thereby imposing upon the gaseous contents of the retort a desired superatmospheric pressure and providing a desired "retention time" of the gases in the incinerator for complete pyro-decomposition.

As was noted hereinabove, fluid waste material is introduced into the inspirator through a feed pipe 30. This feed pipe preferably is an extension of a helical coil 40 which "lines" the conical inner wall of the ceramic tile 16. This coil is connected to the pressure side of an inspirator pump 42 by means of a pipe 43. On its suction side, inspirator pump 42 is connected to a source of fluid waste material, e.g., a surge tank or the like, by conduit means including pipe 45. The just-mentioned source of fluid waste material may be a mixing tank, such as is diagrammatically indicated at 46, whereto there may be delivered the components of the ultimate fluid waste material feed which is to be delivered to the inspirator of the incinerator system.

In any event, the aforesaid "source" shall effectually serve to provide a constant supply of the fluid waste material feed of substantially constant composition. In this connection, it is a characteristic of the method and apparatus of the present invention that the incineration system as a unit shall be scaled (as to capacities of the respective components of apparatus) to treat a substantially constant predetermined volume of ultimate fluid waste material of substantially constant composition, or at least having a substantially constant B.t.u. content per unit of volume. The volume may at times fluctuate below the predetermined norm with no disadvantage except for some slight loss in economy whereas a fluctation to materially above said predetermined norm may result in incomplete decomposition of the waste material. Patently, the desirability of maintaining substantially constant the B.t.u. content of the ultimate feed relates directly to the full and complete decomposition of the feed as a whole. Tank 46, functioning in all events as a "surge" tank and usually, also, as a mixing tank for rendering substantially constant the composition of the ultimate feed, may be, and preferably is provided with an agitator-mixing means such as a stirrer or impeller driven by an electric motor 50. To the tank there extends a valved pipe 51 for water (when the same is desired), a fluid waste feed conduit 52 from a source (not shown) of such waste and an auxiliary liquid fuel line 53 (the latter for use in case the waste fluid is deficient in combustibles and liquid fuel is to be added). Tank 46 may be provided with conventional means, including upper and lower probes 55 and 56, for controlling the level of liquid in the tank.

As was mentioned hereinabove, a feature of the present invention is the concept of supplying to a B.t.u.-deficient fluid waste material the necessary additional combustibles in the form of coal. For this purpose, more or less large pieces of coal can be mingled with the fluid waste material in tank 46 and thoroughly subdivided in situ by means of a high-speed pulverizer including a heavy-duty high speed rotatable dispersing means 59. Thus, coal can be supplied, from a hopper 60 by means of screw conveyor 61 and chute 62 to the fluids within mixing tank 46 and be subjected to dispersing-pulverizing action of dispersing means 59.

In this connection, a nice control over the content of auxiliary fuel can be realized in the following manner. Pipe 45 leading to the suction side of the inspirator pump 42 may be connected to a siphon means 64 which latter includes a tube 65 which dips into the fluid mixture within tank 46. The extent to which the siphon tube 65 extends into the fluid mixture is determined according to the particle size of the subdivided coal suspended in the fluid. Thus, the concentration of coal in the resulting slurry varies with the depth of the body of slurry, and size of the coal particles suspended in the slurry, the smallest particles of course being more readily suspended than are the larger particles. Accordingly, by suitable adjustment of the depth to which the siphon tube 65 extends into the slurry, the B.t.u. content of the ultimate fluid waste material feed can be adjusted and controlled to a pre-determined level.

Figure 5:
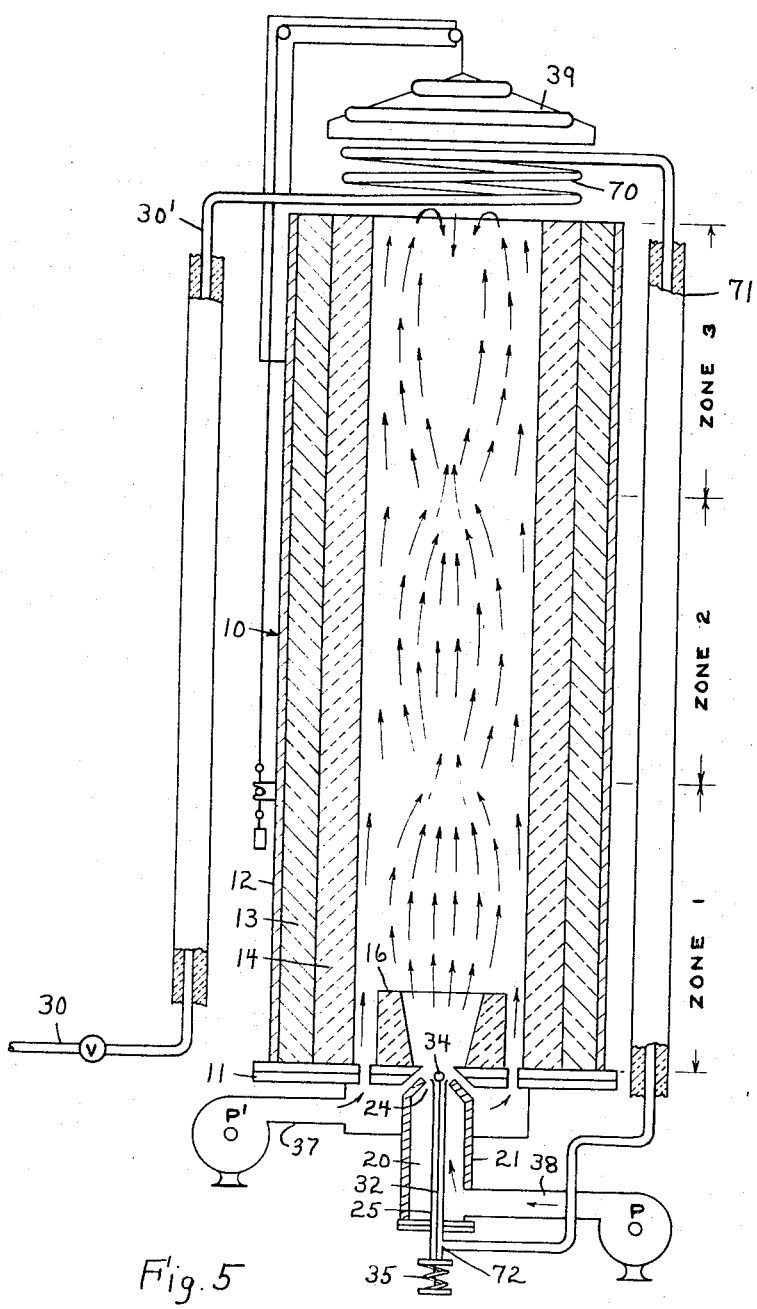
FIG. 5 diagrammatically represents an alternative mode of preheating the waste material feed, utilizing heat of the exhaust gases.

An alternative mode of pre-heating the fluidized waste material just prior to its ejection (atomization) into the lower end of the retort, consists in leading said fluidized waste material—through conventional piping—to the top of the retort whereat it is led through a heating coil disposed either about the circumference of the retort itself or about the periphery of the cover member 39, and thence downwardly, through suitably logged piping, to enter inspirator 20 at the locus shown in FIG. 2. This alternative is represented in FIG. 5, wherein a valved extension 30' of waste pipe 30 is carried on the exterior of the retort 10 to a height equal to the height of the retort and into communication with a heating coil 70 arranged at the top of the retort and hence in position to be bathed by the high-temperature combustion gases issuing from the retort below the periphery of cover member 39. From coil 70 an insulated conduit 71 leads to the entry 72 into ejection pipe 25.

By this measure no useful heat is extracted at the base of the retort, but rather the preheating is effected by B.t.u.'s otherwise carried in the ambient atmosphere in the heated gaseous combustion products. Moreover, since said gases usually exit at very high temperatures, e.g., temperatures of the order of 2000–3000° F., it will be appreciated that by using the aforesaid heating coil in the manner described the fluidized waste material feed may be preheated to practically the temperatures just mentioned, thereby considerably increasing the efficiency and the economy.

The following is a specific example illustrating how pollution of air and of water may be avoided and a troublesome industrial waste thermally decomposed with astonishing economy in disposal costs by practicing the principles of the present invention.

SPECIFIC EXAMPLE

The problem consisted in disposing of the fluid waste (other than that from the sanitary system) accumulating in a stamping plant of an automobile manufacturing company.

*The fluid wastes*

The materials to be disposed of consisted of watery wastes having an oily content which came from a variety of plant sources. Although total volume was fairly constant from day to day (about 12,000 gallons in a normal 24-hour day), the character and content of the waste varied widely. Although nominally the accumlated fluid material was made up of about 90 percent water and 10 percent oil, it sometimes varied from a 97-to-3 ratio one day to as much as 75–25 later in the same week. Components of the total accumulation were derived as follows:

In our blanking area, sheet metal was automatically washed and cleaned as it was uncoiled. The waste from this operation consisted essentially of water and cleaning fluid mixed with oil from the steel stock. Once a week the cleaning fluid supply was drained and replenished with fresh liquid, and at that time a higher-than-normal cleaning-fluid-to-water ratio obtained.

Other waste was generated when the basement was cleaned (once or twice a week). This created a special problem because a detergent was used to assist in the cleaning. All manner of waste (dirt, grease, oil and the detergent itself) was swept and flushed into the main conveyor drain.

Another source of waste were the steam cleaning booths which produced a high volume of water-base mixture of a variety of waste materials.

In the main assembly area of the plant, the welding equipment was water-cooled. This process water went directly to drain after passing through the welders. Also, there were machine leaks and occasionally machine breakdowns that injected small to large quantities of fire-resistant hydraulic fluid into the store of liquid waste. Sometimes the hydraulic fluid became contaminated and had to be pumped out and replaced.

All of the above wastes were carried ultimately into the main plant sumps, from where they were pumped to the waste disposal system.

In sum, the total wastes were watery mixtures, containing varying proportions of machine oil, coolants, hydraulic fluid, cleaning fluids, detergent and grease, plus an assortment of solids—string, bits of paper, cigarettes, metal chips and the like.

Formerly, the worst of the above wastes were accumulated in tank trucks and hauled to locations (in the country) of uncultivatable land where they were dumped. This mode of disposal had three serious drawbacks:

(1) It was costly.

(2) It did not dispose of waste from basement washdown or waste from steam-cleaning booths.

(3) It did not solve the problem of ultimate pollution; merely moved the problem from the plant itself to the dump area.

Because this mode of disposal was undesirable, an incinerator embodying principles of the present invention was installed in the aforesaid plant, and the disposal process of the present invention was adopted.

Figure 3:
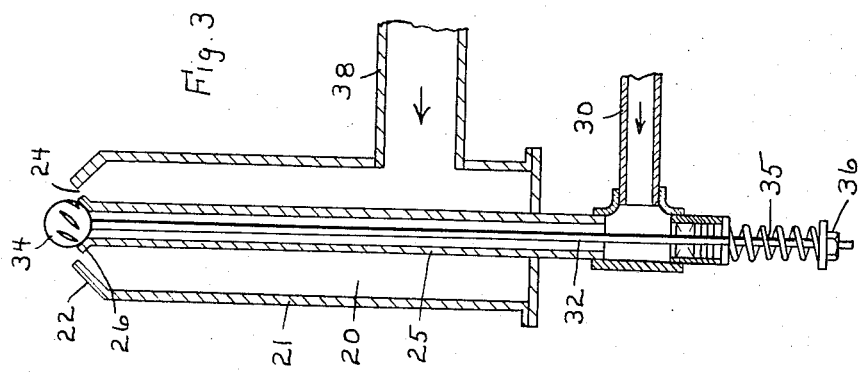
FIG. 3 is a vertical sectional view of the inspirator of the present invention.

FIGS. 2 and 3 of the present patent application illustrate the incinerator structure employed. It was sized to dispose of 500 gallons per hour of the mixed fluid waste, i.e., 12,000 gallons per 24-day. The equipment included two "surge" tanks each of 15,000 gals. capacity, equipped with agitator means. To such tanks were provided in order to operate the process on a "batch" basis. By filling a large holding tank and thoroughly agitating, several important purposes were served: (1) Thereby there was provided a 15,000-gallon batch of a homogeneous mixture; (2) the correct amounts of air and auxiliary fuel for most efficient burning of a given batch could be quickly and easily determined and set; and (3) from the time the adjustment was made until the one tank was emptied—about 30 hours later—the system required no more attention than routine scheduled monitoring by power house personnel.

When one tank had been emptied and the valving had been switched over to admit waste from the other tank, the power house engineer needed only to observe burner performance for a short period of time as indicated on the control panel. A rise in temperature, for example, indicated that a higher oil-to-water ratio existed in the new 15,000 gal. batch of waste liquid. This called for a decrease in auxiliary fuel, and the resetting of fan and blower dampers to produce continued optimum incineration efficiency. Conversely, a temperature drop indicated a lower oil content and called for a proportionate increase in the rate of feed of auxiliary fuel.

In starting up the incinerator, the latter was progressively heated to an internal temperature of approximately 2200° F. Thereupon, liquid waste admixed with auxiliary fuel was pumped from the surge tank to and through the heating coil and thence into the inspirator whence it was atomized with primary air into the lower part of the vertical retort. The amount of auxiliary fuel (fuel oil) admixed with the fluid waste was so adjusted as to bring the operating temperature within the upper part of the retort to from about 2800 to 3000° F., the ratio of fuel oil to watery waste being about 15 gallons of fuel oil to each 100 gallons of the waste. Thereafter the operation was continued observing this same ratio of added fuel to waste, thereby maintaining the aforesaid maximum temperature in the upper part of the retort.

The rate of introduction of primary air was determined to be approximately 584 c.f.m. and that of secondary air was approximately 1749 c.f.m. The gas pressure maintained in the retort was calculated to be about 1½–3 times atmospheric pressure. The B.t.u. content of the waste was calculated to be approximately 7,000 B.t.u.'s per gallon, and the fuel oil used was rated to have a 130,000 B.t.u.'s/gal. thermal value.

High efficiency was achieved through precise control of waste atomization, combustion air, fuel-air mixture, ignition and temperature. Controlled incineration reduced all of the fluid waste material to simple elements and harmless compounds of microscopic particle size. All material was thermally decomposed without smoke, odor or visible ash, thus eliminating any and all possibility of pollution.

I claim:

1. The process of pyro-decomposing a fluid waste material to convert the same into a gaseous fully decomposed reaction product, which comprises completely dispersing with primary air, into the base of a vertical cylindrical elongated space defined in part by refractory walls, the axial length of which space has a 5-to-1 ratio to its diameter, a fluid waste material including a combustible component; initiating the combustion of the combustibles of the air-borne dispersed fluid waste material upon its entry into said space, thereby forming a burning aeroform stream; controlling the combustion to maintain a maximum temperature within the range 2800–3000° F.; maintaining the aeroform contents of the elongated space at a superatmospheric pressure consistent with a desired retention time for the burning stream; surrounding the burning stream with a mantle of secondary air moving in an axial direction only and in the same direction as that of and coextensively with said stream thereby protecting said refractory walls from waste material impingement; and completing the pyro-decomposition by mixing the secondary air of said mantle, in the uppermost zone of said space, with said burning stream whereby to decompose said waste material and to convert the same into a gaseous reaction product free from smoke, odor and visible ash.

2. The process of pyro-decomposition defined in claim 1, further characterized in that said fluid waste material, prior to its atomization, is heated to the temperature of vaporization of at least one vaporizable constituent of said fluid waste material.

3. Apparatus for pyro-decomposing fluid waste material comprising a vertical tubular retort, including a bottom closure and a refractory lining, the lining of the retort being a free-standing mass of refractory material capable of expansion and contraction free from obstruction without anchors and equivalent confining means; the height of the retort and the inner diameter of the retort being in a 5-to-1 ratio; an inspirator axially disposed in the bottom of the retort; a first means for providing a metered stream of primary air to said inspirator; means for feeding fluid waste material to said inspirator; annular means in said bottom and co-axially disposed about and adjacent to the inner wall of said refractory lining for the admission of a mantle of air under pressure; and a separate second means for forcing a current of air under pressure through said annular means and axially upwardly in said retort as a mantle immediately adjacent and parallel to said refractory lining.

4. The pyro-decomposition apparatus defined in claim 3, further characterized by a combustion bowl co-axially disposed at the bottom of the retort and adapted to surround atomized fluid discharged from said inspirator into said retort.

5. The pyro-decomposition apparatus defined in claim 3, and including means for heating a stream of fluid waste material incident to delivering the latter to said inspirator.

6. The pyro-decomposition apparatus defined in claim 5, which includes means for heating a stream of fluid waste material incident to delivering the latter to said inspirator, and in which said heating means is associated with said combustion bowl.

7. The pyro-decomposition apparatus defined in claim 5, in which said heating means is mounted on the top of said retort.

8. The pyro-decomposition apparatus defined in claim 6, further characterized in that said heating means includes a helically coiled conduit for said fluid waste material which helical coil is disposed within said bowl.

9. The pyro-decomposition apparatus defined in claim 3, in which the inspirator comprises a generally up-standing cylindrical part the top portion of which is inwardly flared, an ejection pipe co-axially disposed within said cylindrical part and having an outwardly flared mouth at one end thereof, the inwardly flared part of said cylindrical part and the outwardly flared mouth of said ejection pipe confronting and being so disposed with respect to each other as to define therebetween an annular slit for passage of atomizing air therethrough; means for delivering fluid waste material to the end of said ejection pipe distant from said mouth; the aforesaid means for providing a metered stream of primary air delivering air under pressure to said cylindrical part of said inspirator; and fluid-dispersing means axially adjustably secured adjacent the mouth of said ejection pipe.

10. The pyro-decomposition apparatus defined in claim 3, characterized by the provision of a balanced, weighted adjustable cover member vertically displaceably suspended above the end of said retort opposite said inspirator maintaining a predetermined back-pressure on gases moving upwardly through said retort.

11. The process of pyro-decomposition defined in claim 1, in which the fluid waste material to be decomposed is per se deficient in combustibles and in which said fluid waste material is prepared as feed material for dispersal in primary air by a series of steps comprising adding pieces of coal to a body of the fluidized waste material, disintegrating the coal in situ in the body of fluid, siphoning off from the resulting slurry a supernatant fluid fraction in which are suspended coal particles having sizes not greater than a pre-determined maximum particle size, and forwarding the siphoned-off fraction as said feed material.

12. The pyro-decomposition apparatus defined in claim 3, in which said means for feeding fluid waste material to said inspirator includes a mixing tank equipped with a high speed disintegrator, means for supplying metered amounts of fluid waste material to said mixing tank, means for supplying coal in metered quantity to said mixing tank, a vertically adjustable siphon means extending into said mixing tank for an adjustable distance below a predetermined normal liquid level line, and pump means communicating between said siphon means and said inspirator.

References Cited
UNITED STATES PATENTS

| | | | |
|---|---|---|---|
| 1,322,756 | 11/1919 | Cadwell. | |
| 1,847,020 | 2/1932 | Parker et al. | 158—5 |
| 1,990,787 | 2/1935 | Jessen | 126—59.5 |
| 2,242,653 | 5/1941 | Maxwell | 110—7 |
| 2,628,609 | 2/1953 | Bacon | 126—59.5 |
| 2,648,950 | 8/1953 | Miller | 110—7 X |
| 2,726,715 | 12/1955 | Tegtmeyer | 158—5 |
| 2,806,517 | 9/1957 | Te Nuyl | 158—4 |
| 2,986,206 | 5/1961 | Boelsma | 158—4 |
| 3,195,608 | 7/1965 | Voorheis et al. | 158—5 |

JAMES W. WESTHAVER, *Primary Examiner.*